June 28, 1927.

R. E. STARK 1,633,754

METHOD OF MAKING PRECIPITATED ANTIMONY SULPHIDE

Filed Dec. 26, 1922

INVENTOR.
Rawson E. Stark
BY
Fay, Oberlin & Fay
ATTORNEYS

Patented June 28, 1927.

1,633,754

UNITED STATES PATENT OFFICE.

RAWSON E. STARK, OF ELYRIA, OHIO, ASSIGNOR TO THE STIBIUM PRODUCTS COMPANY, OF ELYRIA, OHIO, A CORPORATION OF OHIO.

METHOD OF MAKING PRECIPITATED ANTIMONY SULPHIDE.

Application filed December 26, 1922. Serial No. 608,917.

In U. S. Patents Nos. 1,414,836 and 1,414,837, granted to Arthur L. Stark under date of May 2, 1922, for improvements in methods of making precipitated antimony sulphide, there is disclosed and broadly claimed a novel method or process, the steps whereof consist in mixing finely ground stibnite, sulphur and a compound capable of forming a water-soluble double salt with antimony together with water, and heating under pressure at an elevated temperature, whereby such water-soluble double sulphide of antimony and of the metal forming the basis of such third ingredient is obtained. In the specification of said Patent No. 1,414,837, it is furthermore explained that the naturally occurring stibnite or needle antimony constitutes merely a preferable form of antimony sulphide, being the form most readily and cheaply to be had; and other forms of the sulphide, whether similarly naturally derived or artificially produced, may be satisfactorily substituted and the metal itself may be employed, if the proper additional amount of sulphur to convert the same into the sulphide be included.

The present invention comprises an improvement or development of the aforesaid patented process wherein an antimony oxide, or so-called oxide residues, is employed in place of the sulphide or metal. Such oxide residues in particular are frequently available as a by-product of other manufacturing processes and the discovery that they can be used in the manufacture of precipitated antimony sulphide or "antimony sulphurette", as the product is ordinarily designated in the trade, not only enables this product to be manufactured at a reduced cost, but avoids the necessity of re-working such residues, if the values contained therein are not to be entirely lost.

To the accomplishment of the foregoing and related ends, the invention, then, consists of the steps hereinafter fully described and particularly pointed out in the claims, the annexed drawing and the following description disclosing but several of the various ways in which the principle of the invention may be carried out.

In the annexed drawing:—

Figure 1:
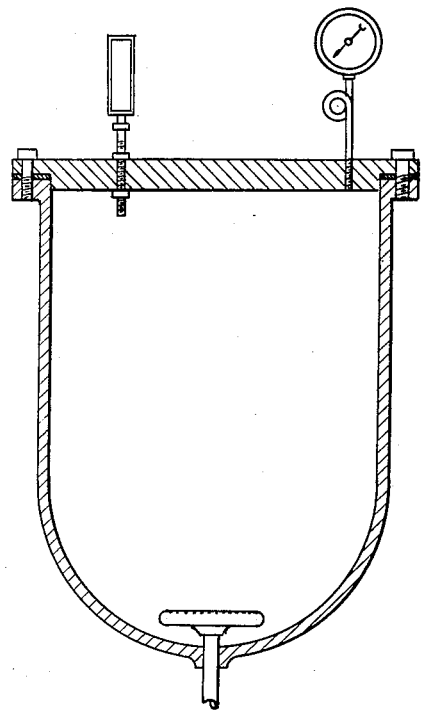
Figure 2:
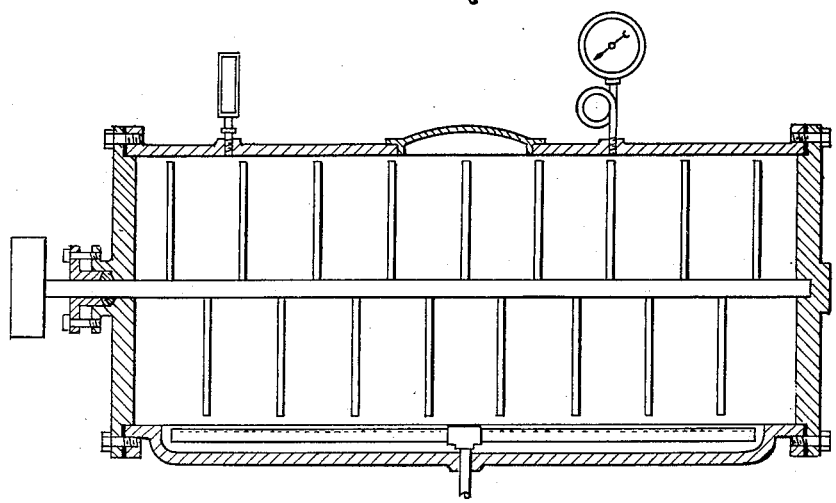

Fig. 1 is a more or less diagrammatic representation of one form of apparatus, specifically a vertically disposed autoclave or digester suitable for carrying out my present improved process, while Fig. 2 is a similar representation of a horizontal digester.

Any of the known oxides of antimony or an intermixture thereof may be employed in my present improved process, such oxides as listed comprising the trioxide ($Sb_4O_6$), the tetroxide ($Sb_2O_4$), and the pentoxide ($Sb_2O_5$). The tetroxide or antimonious antimonic oxide, as is well known, is formed when either of the two other oxides is strongly heated in the air and so-called antimony-ash, obtained by roasting the sulphide in the air, is an impure tetroxide. Moreover, both the trioxide and said tetroxide occur in the minerals valentinite and cervantite. The foregoing oxides, as well as salts of the corresponding acids, will for convenience be designated in the present connection as oxygen derivatives of antimony.

In carrying out the present process, such oxygen derivative is first ground to a fine impalpable powder. Thereupon sulphur and a compound capable of forming a soluble double salt with antimony are added. As examples of compounds suitable for this purpose, I may mention quicklime (CaO), barium oxide (BaO), and strontium oxide (SrO), which may be generically referred to as oxides of the alkaline earth metals, it being understood that these, as a matter of fact, are converted promptly into the corresponding hydroxides as the result of the addition of water, as called for by the process, and if desired, such hydroxides may be directly admixed with the other ingredients named above. I have also found that corresponding oxygen compounds of the alkali metals are satisfactory for the purpose, for example, potassium hydroxide (KOH), sodium hydroxide (NaOH), or lithium hydroxide (LiOH). It will also be understood that mixtures of two or more of the foregoing oxygen compounds, of either or both series, may be employed.

Both the sulphur and such last mentioned compounds are in powdered form and are thoroughly intermixed with each other and with the powdered oxygen derivative of antimony; whereupon the mixture is gradually moistened with water until a paste or slightly fluid mass is formed. Following this a quantity of the mixture thus prepared is placed, with more water, in an autoclave or digester, either of the vertical type illustrated in Fig. 1, or of the horizontal type shown in Fig. 2, and boiled under pressure at a high temperature. Where the vertical type of autoclave is used, the steam is preferably interjected at the bottom and so not only serves to bring the mixture to the desired temperature, but also to agitate the same; while with the horizontal type of apparatus, mechanical means are necessary in order to insure thorough agitation of the mass. The treatment in question is continued until substantially all of the solid constituents have been converted into the water-soluble double salt of antimony, e. g., double antimony barium sulphide ($Sb_2S_3.xBaS_x$), where the compound employed along with the sulphur is barium oxide.

As a matter of fact, in place of barium oxide or the other equivalent oxides or hydroxides of the alkali and alkali earth metals, referred to above, the sulphur compounds of these metals, and particularly of barium and calcium, may be employed with equally satisfactory results just as pointed out in a later patent of Arthur L. Stark, viz, No. 1,415,127, dated May 9, 1922, may be done in the case of the original process of Patents Nos. 1,414,836 and 1,414,837, and in the claims hereinafter the expression "an agent supplying a combinable metal" is intended to designate any of the above named compounds or operative equivalent.

The solution obtained by the foregoing treatment of the mixture of an oxygen derivative of antimony with sulphur and such third compound is then removed, and upon addition to a suitable acid, either hydrochloric or sulphuric acid, the desired antimony sulphide or sulphurette, consisting principally, if not altogether, of the pentasulphide, is precipitated out in the form of a very fine impalpable powder. A larger amount of sulphur will of course be required where an antimony oxide is employed, instead of stibnite, in order to give the equivalents of approximately equal parts of such stibnite, sulphur and the third ingredient in the process as described. The pressure and temperature at which the treatment in the autoclave is conducted will remain approximately as before, viz., a pressure of from sixty to eighty pounds and a temperature of from 145° to 155° C.

I have found that instead of precipitating the antimony sulphide from the beforementioned solution by adding the latter to either hydrochloric or sulphuric acid, which is the usual way for effecting such precipitation, it may be advantageous to include a suitable metallic chloride with either such acid or mixture of the same; or a suitable metallic sulphate may be similarly employed. Thus, for example, antimony trichloride ($Sb_2Cl_6$) or the pentachloride ($Sb_2Cl_5$) may be used in such acid or acid mixture, or else such chloride may be used by itself, eliminating the acid, with the result in any case that an additional quantity of antimony sulphide is precipitated from the solution the reaction being indicated by the following illustrative equation:—

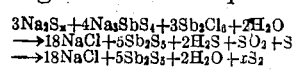

Instead of a salt of antimony, as for example, the chlorides just referred to, salts of a different metal such as arsenic may be added with the result that the sulphide of such other metal will be precipitated along with the antimony sulphide that would be precipitated from the solution were the same added merely to an acid. Thus, the two sulphides will be co-precipitated in the form of an intimate mixture especially adapted for certain commerical uses. It will be understood furthermore that antimony oxide, or in the case of a different metal, the oxide thereof, e. g., arsenious oxide in the case of arsenic, may be added to the precipitant consisting of hydrochloric or sulphuric acid as aforesaid, or any equivalent acid or acid mixture, and by the expression "compound of a reactable metal of related series", I intend any of the above named compounds or operative equivalents.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. A process of making antimony sulphide, which includes treating an oxy-compound of antimony with sulphur and an agent supplying a combinable metal, and subjecting the reaction-product to a precipitating action.

2. A process of making antimony sulphide, which includes treating an oxy-compound of antimony with sulphur and an agent supplying a combinable metal, and subjecting the reaction-product to a precipitating agent comprising an inorganic acid.

3. A process of making antimony sulphide, which includes treating an oxy-compound of antimony with sulphur and an agent supplying a combinable metal, and subjecting the reaction-product to a precipitating agent comprising a compound of a reactable metal of related series.

4. A process of making antimony sulphide, which includes treating an oxy-compound of antimony with sulphur and a base, and subjecting the reaction-product to a precipitating agent comprising an inorganic acid and a compound of a sulphide forming metal.

5. A process of making antimony sulphide, which includes subjecting a solution of a compound-sulphide of antimony to a precipitating agent comprising an inorganic acid and a compound of a reactable metal of related series.

6. A process of the character described, which includes subjecting a solution of a compound-sulphide of antimony to a precipitating agent comprising an inorganic acid and an antimony compound.

7. A process of making antimony sulphide, which includes subjecting a solution of a compound-sulphide of antimony to a precipitating agent comprising hydrochloric acid and a compound of a reactable metal of related series.

8. A process of the character described, which includes subjecting a solution of a compound-sulphide of antimony to a precipitating agent comprising an antimony compound.

9. A process of the character described, which includes subjecting a solution of a compound-sulphide of antimony to a precipitating agent comprising hydrochloric acid and an antimony compound.

10. A process of the character described, which includes subjecting a solution of a compound-sulphide of antimony to a precipitating agent comprising hydrochloric acid and antimony chloride.

11. A process of the character described, which includes heating at a temperature of 145° to 155° C. an oxy-compound of antimony with sulphur and an alkaline solution and then precipitating out antimony as a sulphide.

12. A process of making antimony sulphide, which includes heating at a temperature of 145° to 155° C. an oxy-compound of antimony with sulphur and lime in the presence of water, and subjecting the product to the action of antimony chloride and an inorganic acid.

13. A process of making antimony sulphide which includes heating an oxy-compound of antimony with sulphur and an agent supplying a combinable metal, in the presence of water, and then precipitating out antimony as a sulphide.

14. A process of the character described, which includes mixing an oxy-compound of antimony, sulphur and an alkaline-earth compound, together with water, heating under pressure, and then precipitating out antimony sulphide.

15. A process of the character described, which includes mixing an oxy-compound of antimony, sulphur and lime, together with water, heating under pressure and then precipitating out antimony sulphide.

16. A process of the character described, which includes mixing an oxy-compound of antimony, sulphur and lime, together with water, heating under pressure, and then subjecting the product to the action of an inorganic acid.

17. A process of making antimony sulphide, which includes mixing an oxy-compound of antimony, sulphur and lime, together with water, heating under pressure, and then subjecting the product to the action of an inorganic acid and a compound of a reactable metal of related series.

Signed by me this 23rd day of December, 1922.

RAWSON E. STARK.